United States Patent
Dasar et al.

(10) Patent No.: US 10,783,541 B2
(45) Date of Patent: Sep. 22, 2020

(54) SYSTEMS AND METHODS OF USING INDIRECT USER INPUT SIGNAL CHARACTERISTICS TO CONTROL INVENTORY AND/OR SERVER OPERATIONS

(71) Applicant: DELL PRODUCTS L.P., Round Rock, TX (US)

(72) Inventors: Sundar Dasar, Round Rock, TX (US); Muninder Raja Arram, Telangana (IN); Olusola E. Aluko, Cedar Park, TX (US); Anthony W. Pladies, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 282 days.

(21) Appl. No.: 15/691,325

(22) Filed: Aug. 30, 2017

(65) Prior Publication Data
US 2019/0066143 A1 Feb. 28, 2019

(51) Int. Cl.
*G06Q 30/00* (2012.01)
*G06Q 30/02* (2012.01)
*G06Q 10/08* (2012.01)
*H04L 29/08* (2006.01)
*G05B 19/418* (2006.01)

(52) U.S. Cl.
CPC ....... *G06Q 30/0223* (2013.01); *G06Q 10/087* (2013.01); *G06Q 30/0235* (2013.01); *H04L 67/22* (2013.01)

(58) Field of Classification Search
CPC .......... G06Q 30/0223; G06Q 30/0235; G06Q 10/087; H04L 67/22
See application file for complete search history.

(56) References Cited

U.S. PATENT DOCUMENTS 5,485,369 A * 1/1996 Nicholls .......... G06Q 10/06311
705/7.13
6,075,971 A 6/2000 Williams et al.
(Continued)

OTHER PUBLICATIONS

"An e-shop log file analysis toolbox". (Year: 2010).*
(Continued)

*Primary Examiner* — Maria V Vanderhorst
(74) *Attorney, Agent, or Firm* — Egan Peterman Enders Huston (57) ABSTRACT

Systems and methods are provided that may be implemented to control inventory and/or server operations at a remote information handling system based on indirect characteristics of user input signals provided by a user to a client information handling system, and relayed to a server information handling system. Indirect characteristics of user input signals may include, but are not limited to, a pattern of mouse or touchpad pointer movements made on a given webpage, duration of time spent by a user on a given webpage, etc. Inventory and server operations that may be controlled based on monitored indirect user input signal characteristics include, but are not limited to, change of status or movement of inventory between locations and/or a change in the amount of inventory maintained at a given remote location, altering the amount of inventory reserved for future purchase and delivery, and altering duration time and/or expiration date of a limited-time reduced price offer.

30 Claims, 4 Drawing Sheets

(56) References Cited

U.S. PATENT DOCUMENTS

| | | | |
|---|---|---|---|
| 6,336,099 B1 | 1/2002 | Barnett et al. | |
| 8,140,398 B1 | 3/2012 | Boesjes | |
| 8,533,039 B1 | 9/2013 | Winslade et al. | |
| 8,700,829 B2 | 4/2014 | Casparian et al. | |
| 9,292,108 B2 | 3/2016 | Ballard et al. | |
| 2004/0176998 A1* | 9/2004 | Kirshenbaum | G06Q 10/087 705/14.71 |
| 2011/0251868 A1* | 10/2011 | Mikurak | G06Q 10/06 705/7.25 |
| 2012/0323656 A1* | 12/2012 | Leach | G06Q 30/0239 705/14.17 |
| 2014/0164094 A1* | 6/2014 | Bhatia | G06Q 30/0251 705/14.41 |
| 2014/0213344 A1* | 7/2014 | Rose | G06Q 30/0601 463/25 |

OTHER PUBLICATIONS

DPS Telecom, "Operate Remote Site Equipment From Your NOC of Any Web Browser", Printed from Internet on Jul. 30, 2017, 2 pgs.
Automation, "Web-Enabling Your PLC", Printed From Internet on Jul. 30, 2017, 9 pgs.
Toptal, "How Can I Pass the User's Cursor's/Click's Coordinates to a Server using PHP?", Printed from Internet on Aug. 2, 2017, 2 pgs.
Canon, "Browser Remote" Controlling the Camcorder From the Web Browser of a Network Device and Recording (XC10), Last updated Dec. 9, 2015, 18 pgs.

* cited by examiner

SYSTEMS AND METHODS OF USING INDIRECT USER INPUT SIGNAL CHARACTERISTICS TO CONTROL INVENTORY AND/OR SERVER OPERATIONS

FIELD

This invention relates generally to information handling systems and, more particularly, to user input signals.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Client information handling systems (desktop computers, notebook computers, smart phones, tablet computers) communicate across the Internet with remote server systems for a variety of purposes. A client system typically includes a graphical user interface (GUI) for displaying to a user the webpage information provided from the remote server system, and for accepting input from the user that is provided from the client system as input signals to the server system. Direct user input signals in the form of clicking on a web link or entering text into a web textbox form may be used to cause remote operations such as to allow a user to control remote equipment or to remotely select and purchase products and services that are offered on a webpage provided from the server system. Besides products and services, online retailers also provide time-sensitive coupons and discount offers from a remote server system to a user operating a remote client system. Such coupons and discount offers are often provided during major purchasing events and holidays, and may be selected or entered by direct user input (clicking on web link or entering text into a web textbox) to the client system to cause purchase of a product or service prior to expiration date of the coupon or offer.

It is known to charge a customer a late fee for a DVD rental that is not returned on time. If this late fee is not paid, then the customer is required to pay a larger fee for ownership of the DVD. Airlines have also offered to hold the current price of a ticket in exchange for payment of a fee to hold the ticket price by a customer that has not yet purchased the ticket.

SUMMARY

Disclosed herein are systems and methods that may be implemented to control inventory and/or server operations at a remote information handling system based on indirect characteristics of user input signals provided by a user to a client information handling system, and relayed to a server information handling system, e.g., across a computer network such as the Internet or corporate intranet as user input signal information. Indirect characteristics of user input signals refer to characteristics derived from direct user input signal actions made by a user such as individual mouse clicks on webpage links or icons, individual keyboard key press actions including the return key, and user text entries (e.g., entry of words and/or numbers). Examples of indirect characteristics of user input signals include, but are not limited to, a pattern of mouse or touchpad pointer movements made on (e.g., across) a given webpage, duration of time spent by a user on a given webpage displayed to the user by a browser executing on the client information handling system, etc.

Examples of inventory and server operations that may be controlled based on monitored (e.g., measured) indirect user input signal characteristics include, but are not limited to, change of status or movement of inventory between locations and/or a change in the amount of inventory maintained at a given remote location, altering the amount of inventory reserved for future purchase and delivery, altering duration time or expiration date of a limited-time reduced price offer (e.g., promotion, discount or coupon) offered to users of client systems from a remote server, etc. In a further embodiment, control of such inventory and/or server operations may be further conditioned on a user commitment, e.g., such as current payment of a required fee by the user, before the inventory or server operations are affected by the measured indirect user input signal characteristics.

In one embodiment, identity and/or amount of physical items (e.g., physical goods or commodities) maintained at one or more locations (e.g., warehouses, storage facilities, etc.) may be selected, allocated and/or reserved for future purchase and delivery to users based on measured indirect characteristics of user input signals that are input by a user to a client information handling system and relayed to a server information handling system as user input signal information. In this way, indirect user input signal characteristics may be measured and employed to determine latent user demand for particular inventory items, and to control amounts, status and/or identity of inventory maintained at a given location based on the determined latent user demand. This in turn allows inventory to be obtained and/or maintained that matches the determined user latent demand. Similar methodology may be further applied for scheduling amount of future inventory to have on hand at particular dates or during particular date ranges (e.g., such as number of reserved on-hand items, etc.).

In another exemplary embodiment, server operations may additionally or alternatively be controlled based on measured indirect user input signal characteristics. Examples of such server operations include, but are not limited to, selecting or altering information that is provided to a client system for display to a user, including interactive user display information that presents customized user input opportunity for the user, e.g., such as customized user opportunity to buy an inventory item at a particular price. For example, the accuracy of a determined latent user demand for inventory may be improved by optionally requiring payment of a fee by the user to reserve a future opportunity for the user to purchase certain inventory items (e.g., physical goods, commodities and/or services) at a current defined price that is valid for acceptance by the user until a specified future date or within a specified date range. The specified future date or date range may represent an extended time period for honoring a current price that would otherwise expire at a date before the specified future date or date range. This embodiment may be further implemented to capture a customer user's latent desire for particular inventory items early in the process by enabling the user to extend a merchant limited-time reduced price offer (e.g., promotion, discount or coupon) in exchange for a current fee payment made by the user. The reduced price offer may in one embodiment be a reduced price applicable to a variety of items (or all items offered by the merchant website) that is not limited to the specific item that the user is currently interested in. The type of limited-time reduced price offer may be, for example, a percentage reduction in purchase price coupon, a reduced currency amount (e.g., "X" dollars off) from purchase price coupon, a multiple item promotion (e.g., two-for-one offer), etc.

In one embodiment, a server system may be controlled based on measured indirect user input signal characteristics to require that a customer-client system user pay an online fee to reserve an opportunity for future purchase of an item/s at a discounted price. Payment of such a fee by a user may be utilized to demonstrate the customer's commitment to buy the item/s at a future date or date range. Further actions may be optionally taken by the server system and/or other information handling systems upon receipt of such a fee payment from the user, including reservation or movement of inventory items based on this signal of the customer's potential purchase, procurement of additional inventory items based on this signal of the customer's potential purchase, etc. Thus, in one embodiment, the disclosed systems and methods may be implemented to alter server operations so as to more accurately measure customer demand for a given item/s, increase the chance that a given customer will purchase the item/s, optimize inventory amount and location to match customer demand for given item/s, and/or alter cost for extending reduced pricing to more accurately respond to customer demand for the item/s.

The above-described embodiment is in contrast to conventional online merchant server operation technology where it is not possible for a merchant to capture a customer's latent desire to purchase a particular item/s that is currently offered at a limited-time discount price from input signals provided by a user at a client information handling system. In this regard, many customers are hesitant to purchase a currently-discounted item due to uncertainty as to whether future discounts may be offered on the same or other items after expiration of the current discounted price. Examples of such possible future discounts include larger discounts that may be offered on the price of the same item, discount prices that may be offered for other items that the customer is also interested in, etc. For example, discounts offered during major purchasing events such as Black Friday or Cyber Monday time periods represent an opportunity for customers to buy items now at uniquely attractive prices. A customer's desire to buy particular item/s during such a time constitutes a demand signal from the customer that a merchant operating a host server to sell the item/s would like to capture either immediately or in the future. However, due to discount timing, as well as the inability to identify and match specific customers' needs or desires to specific items at a specific price point, merchants are conventionally unable to maximize this demand. When this occurs, a customer is unable to take advantage of discounted price for a desired item before the coupon expires, and the merchant is unable to maximize the conversion of prospect users into actual paying customers. By measuring indirect user input signal characteristics at a client system, the disclosed systems and methods may be implemented to address these disadvantages of conventional client-server systems by capturing latent customer demand for particular items and converting this latent demand into paying customers. This results in increased user flexibility and improved user satisfaction and good will, as well as increased revenue for the merchant by increasing sales and generating additional revenue from user payments for extended reduced price offers.

In one respect, disclosed herein is a method of operating a server information handling system, including: receiving user input signal information across a network from a client information handling system; monitoring indirect user input signal characteristics from the user input signal information; and controlling at least one of operation of the server information handling system or number or status of items in an item inventory based on the monitored indirect user input signal characteristics.

In another respect, disclosed herein is a server information handling system, including at least one processing device programmed to: receive user input signal information across a network from a client information handling system; monitor indirect user input signal characteristics from the user input signal information; and control at least one of operation of the server information handling system or number or status of items in an item inventory based on the monitored indirect user input signal characteristics.

In another respect, disclosed herein is a system, including a server information handling system coupled by a network to a client information handling system; where the client information handling system includes at least one processing device to receive user input signals from a current user via at least one user input device coupled to the client information handling system, and to provide user input signal information based on the user input signals across a network to at least one processing device of the server information handling system; and where the at least one processing device of the server information handling system is programmed to: monitor indirect user input signal characteristics from the user input signal information; and control at least one of operation of the server information handling system or number or status of items in an item inventory based on the monitored indirect user input signal characteristics.

DESCRIPTION OF ILLUSTRATIVE EMBODIMENTS

Figure 1:
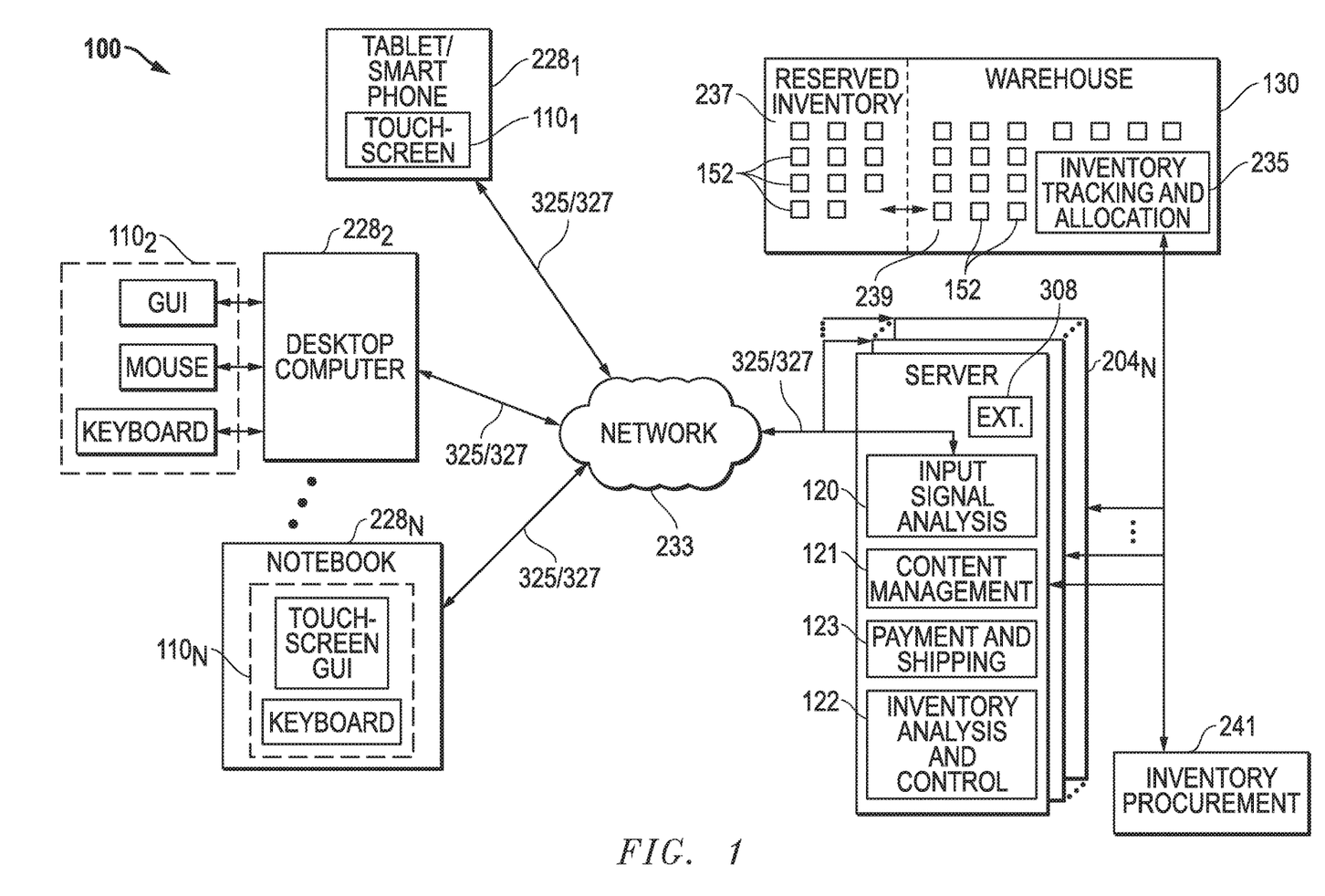
FIG. 1 illustrates a block diagram of a network architecture according to one exemplary embodiment of the disclosed systems and methods.

FIG. 1 illustrates one exemplary embodiment of network architecture 100 that includes multiple client information handling systems $228_1$-$228_N$ that are in communication (e.g., via TCP/IP or Internet protocol) with at least one or more server information handling systems 204 across a network 233, such as the Internet or a corporate intranet. Server information handling system $204_1$-$204_N$ is in turn coupled to at least one information handling system 235 that is configured to perform inventory tracking and allocation for inventory items 152 maintained in warehouse 130, although it does not have to be co-located with warehouse 130. In this embodiment, warehouse 130 maintains reserved inventory 237 that is allocated for future purpose and delivery to customers, and maintains an available inventory 239 that is freely available for current purchase and delivery to customers.

Information handling system 235 may be configured to track presence and/or movement of inventory items 152, for example, by using an antenna and RF receiver to receive radio frequency identification (RFID) signals transmitted from RFID tags attached to individual items 152 that indicate real time presence and/or location of each item 152 within warehouse 130, by receiving manual input from warehouse workers (e.g., scanning individual item barcodes) that indicate presence and/or location of each item 152 within warehouse 130, etc. Information handling system 235 may be configured to allocate inventory items 152, for example, by maintaining and updating a database (e.g., lookup table) that indicates status of individual items 152 or groups of items 152 (or numbers of individual items 152) within warehouse 130. Examples of such status include, but are not limited to, reserved item/s for existing orders, reserved item/s for future purchases, item/s available for current purchase, etc.

Information handling systems $204_1$-$204_N$ may also be coupled to at least one other another information handling system 241 as shown, which may be configured to handle procurement of new inventory to add to or replace inventory that is removed from warehouse 130, e.g., due to transfer or shipment of items 152 to customers that is reported by information handling system 235. Information handling system 241 may also be coupled to procure additional inventory by communicating requests (e.g., purchase orders or item transfer orders) to external suppliers, merchants and/or other warehouse locations for additional inventory of items 152 to be transferred to warehouse 130. It will be understood that the tasks described herein for systems 204, 235 and/or 241 may be further divided between multiple information systems, may be consolidated into one or more common information systems, and/or may be supplemented by additional tasks not described herein. Further, additional information systems may be coupled to network architecture 100 that operate to perform one or more additional, alternative or different tasks not described herein.

As shown in FIG. 1, a variety of different types of client information handling systems 228 may be coupled to server systems 204 including, for example, tablet or smart phone $228_1$, desktop computer $228_2$, notebook computer $228_N$, etc. As further shown, each of client systems 228 are coupled to receive user input signals from a user input device 110, such as touch screen, mouse, keyboard, etc. In one exemplary embodiment, a server 204 may be configured to provide information via data 327 to users of client information handling systems 228 regarding inventory items 152, e.g., such as listings of items 152 for sale, descriptions of items 152, prices for items 152, etc. A server 204 may also be configured to receive data that includes user input signal information 325 from users of systems 228, including selection and purchase of items 152. Inventory items 152 may be physical goods (e.g., electronic devices, tools, cosmetics, groceries, etc.) or other types of physical items such as commodities (e.g., petroleum liquids or gases, etc.), etc. maintained in a warehouse 130 or other storage facility. Further, it will be understood that the illustrated multiple items 152 may represent a mixture of different types of items maintained in one or more warehouses or other types of storage facilities 130. In this regard reserved inventory 237 and/or available inventory 239 may represent a group of items that are stored in multiple storage facilities 130 that are tracked and managed as a common inventory 237/239.

Still referring to FIG. 1, each of server systems $204_1$-$204_N$ may include input signal analysis logic 120 that is programmed to receive and measure indirect characteristics of user input signal information 325 in data received from client devices 228 in a manner described elsewhere herein. Other tasks that may be executed by each server system 204 includes content management logic 121 that controls webpage information displayed to users of client side devices 228 (e.g., including product descriptions and images, etc.), inventory analysis and control logic 122 which may be programmed to interact with inventory tracking and allocation system 235 to receive updated inventory tracking information, e.g., number of currently reserved items 152 in reserved inventory 237, number of currently available items 152 in available inventory 239, etc. Inventory analysis and control logic 122 may also interact with inventory tracking and allocation system 235 to control disposition or classification of inventory items 152, e.g., such as causing automated or manual movement of inventory items 152 between different warehouses 130, to cause change in the amount of inventory items 152 to be maintained at a given warehouse 130, to alter the amount of inventory items 152 reserved in reserved inventory 237 for future purchase and delivery, etc. Inventory analysis and control logic 122 of server system 204 may also interact with inventory procurement system 233 to cause purchase or to otherwise acquire additional inventory items 152 for warehouse/s 130.

As shown in FIG. 1, each server system 204 may also execute payment and shopping logic 123 that is configured to control details of transactions for purchase of inventory items 152 by individual users of client systems 228 based on input signals received from the users of clients systems 228. In one embodiment, payment and shopping logic 123 may provide webpage information (e.g., interactive web pages) to users of client information handling systems 228 regarding inventory items 152, e.g., such as listings of items 152 for sale, descriptions of items 152, pricing for items 152, etc. A server 204 may also be configured to receive user input signals entered into a webpage from users of systems 228 via input devices 110, including user input signals to select and purchase particular items 152 for delivery to the user, user input signals to request display of additional item detail (e.g., descriptive information and/or price information) and/or shipping information (e.g., different types of shipping and shipping costs for same), etc. As will be described herein, payment and shopping logic 123 may also control purchase options for users interesting in purchasing item/s 152 based on measured indirect characteristics of user input signals in user input signal information 325 received from client systems 228. Such options include, for example, altering expiration time ($T_{EXP}$) of a reduced price currently offered to users of client systems 228 from server/s 204, selecting and/or altering the identity of a reduced price currently offered to users of client systems 228 from a server/s 204 based on availability of current inventory, etc.

Figure 2:
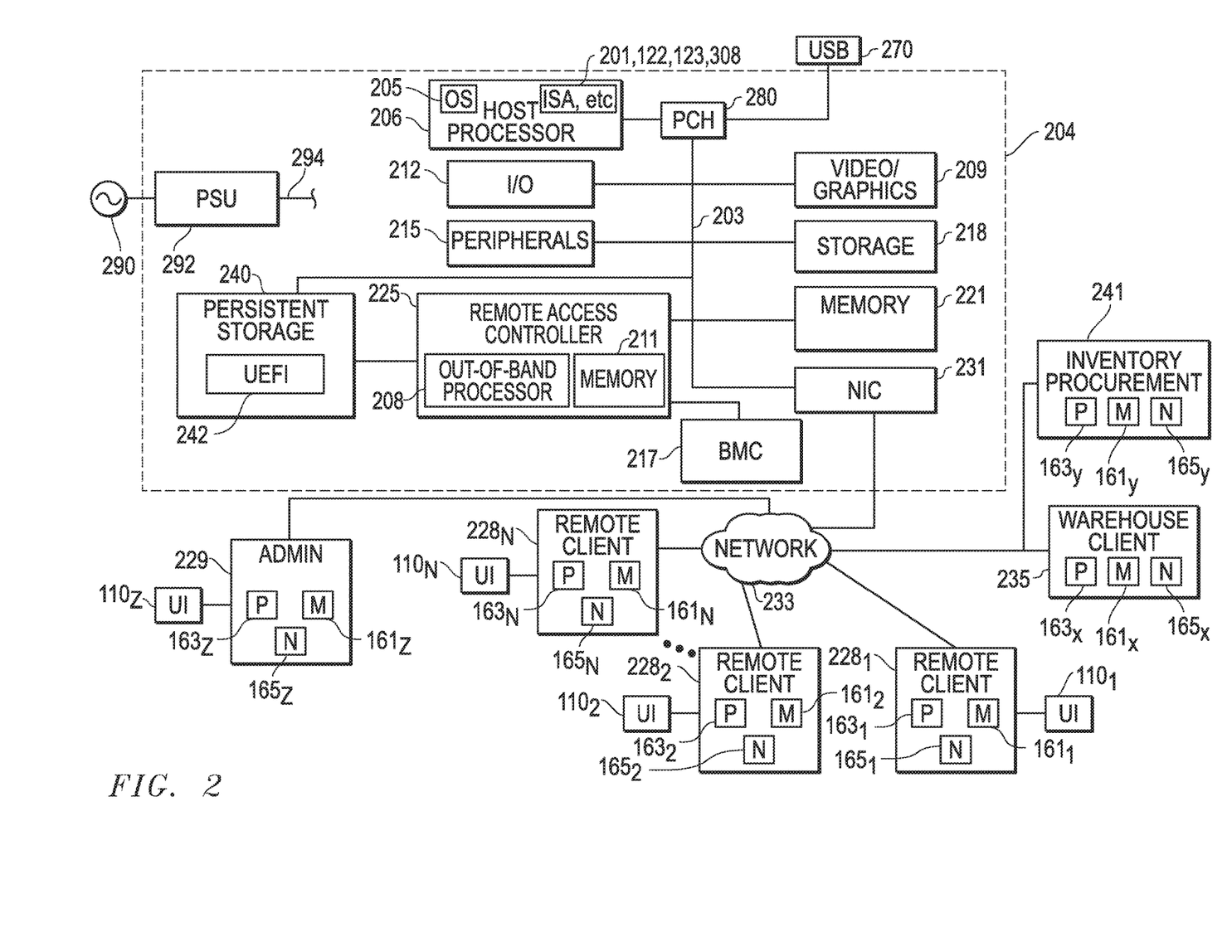
FIG. 2 illustrates a block diagram of a server information handling system as it may be configured in relation to other systems according to one exemplary embodiment of the disclosed systems and methods.

FIG. 2 is a block diagram of a server information handling system 204 as it may be configured in relation to other systems according to one exemplary embodiment, it being understood that the disclosed systems and methods may be implemented with other information handling system configurations including fewer, additional and/or alternative hardware and/or software/firmware components. As shown, system 204 may include at least one host processing device 206 (e.g., AMD or Intel-based CPU such as Itanium or any other type of suitable host processing device), one or more buses or communication media 203 (e.g., PCIe bus, USB, SMBus, SATA, other appropriate data buses such as memory bus, etc.), video/graphics hardware (e.g., video adapter or graphics processor unit) 209, non-volatile storage 218 (e.g., hard disk drive, optical disk drive, solid state drive memory, etc.), system volatile memory (e.g., DRAM) 221, local input/output (I/O) 212, peripherals 215, and remote access controller (RAC) 225 having one or more out-of-band processing devices 208 and memory 211. Examples of remote access controller 225 include an integrated Dell Remote Access Controller (iDRAC) available from Dell Products L.P. of Round Rock, Tex., etc.). Remote access controller 225 is coupled to persistent non-volatile memory storage 240 (e.g., embedded and partitioned flash memory, Electrically Erasable Programmable Read Only Memory—EEPROM, other types of non-volatile random access memory "NVRAM", etc.) that is configured to store persistent information for remote access controller 225 and information for other system components, e.g., including Unified Extensible Firmware Interface (UEFI) firmware 242 as well as other information such as Advanced Configuration and Power Interface (ACPI) information, other system BIOS firmware (e.g., in the form of system management SMBIOS data), etc.

In this embodiment of FIG. 2, server system 204 also includes a baseboard management controller (BMC) 217 that is communicatively coupled to remote access controller 225 as shown. Remote access controller 225 may be configured to allow remote users to manage, administer, use, and/or access various resources of host system 204 (e.g., either native or virtual) from a remote location, e.g., via network 233 and/or other suitable communication media. Further, out-of-band processing device 208 is a separate and independent processing device from any in-band host central processing unit (CPU) such as host processing device/s 206 that is configured to load and run UEFI 242 as well as a host OS 205 (e.g., Microsoft Windows-based OS, Linux-based OS, etc.) and other logic described in relation to FIG. 1 that includes input signal analysis logic 120, content management logic 121, inventory analysis and control logic 122, payment and shipping logic 123, etc. Out-of-band processing device 208 of remote access controller 225 may be a service processor, embedded processor, etc. Out-of-band processing device 208 may operate without management of UEFI, any separate system BIOS and any application executing with a host OS 205 on the host processing device/s 206.

Bus/es 203 provides a mechanism for the various components of system 204 to communicate and couple with one another. As shown, host processing device/s 206 may be coupled in one embodiment to bus/es 203 via embedded platform controller hub (PCH) 280 which may be present to facilitate input/output functions for the processing device/s 206 with various internal components of information handling system 100 and USB 270. Video/graphics 209, storage 218, memory 221, I/O 212 and optional peripherals 215 (e.g., keyboard, mouse, etc.) may have the structure, and perform the functions known to those of skill in the art. Besides volatile memory 221 (e.g., random access memory "RAM"), processor 206 may include cache memory for storage of frequently accessed data, and storage 218 may include extended memory for processing device/s 206. Server information handling system 204 may also include a network access card (NIC) 231 that is communicatively coupled to network 233 (e.g., Internet or corporate intranet) as shown to allow various components of system 204 to communicate with client systems 228, inventory tracking and allocation system 235, inventory procurement system 241 across network 233 and administrator information handling system 229. In this embodiment, information handling system 204 also includes power supply unit (PSU) 292 that is coupled to receive power from AC mains 290 and to perform appropriate power conversion and voltage regulation to produce regulated internal power 294 for use by other power-consuming components of system 204.

FIG. 2 also illustrates user input devices $110_1$ to $110_N$ that are coupled to provide user input signals to respective client systems 228 which each include a respective host processor 163, system memory 161 (e.g., volatile and non-volatile), and network interface card or adapter 165. Host processor 163 of each of client systems $228_1$ to $228_N$ executes an operating system (Microsoft Windows-based OS, Linux-based OS, Apple iOS, etc.) that may include drivers for accepting mouse or touchpad signals, scan codes and/or other user input signals from user input devices 110. Host processor 163 may also execute a web browser and/or one more applications that accept the user input signals and perform further operations or actions based on these signals, including local processing, memory and display actions. In one embodiment, such programs may include JavaScript engines that are configured to track mouse movements and pass them as signals to input signal analysis logic 120 of server system 204 over network 233. Host processor 163 may also transmit user input signal information 325 to server system 204 that include or that are indicative of the user input signals. Further information on keyboard and mouse operation may be found in U.S. Pat. Nos. 8,700,829 and 9,292,108, each of which is incorporated herein by reference in its entirety for all purposes. Communications between input devices 110 and server system 204 across network 233 may be via wired and/or wireless signals.

Figure 3:
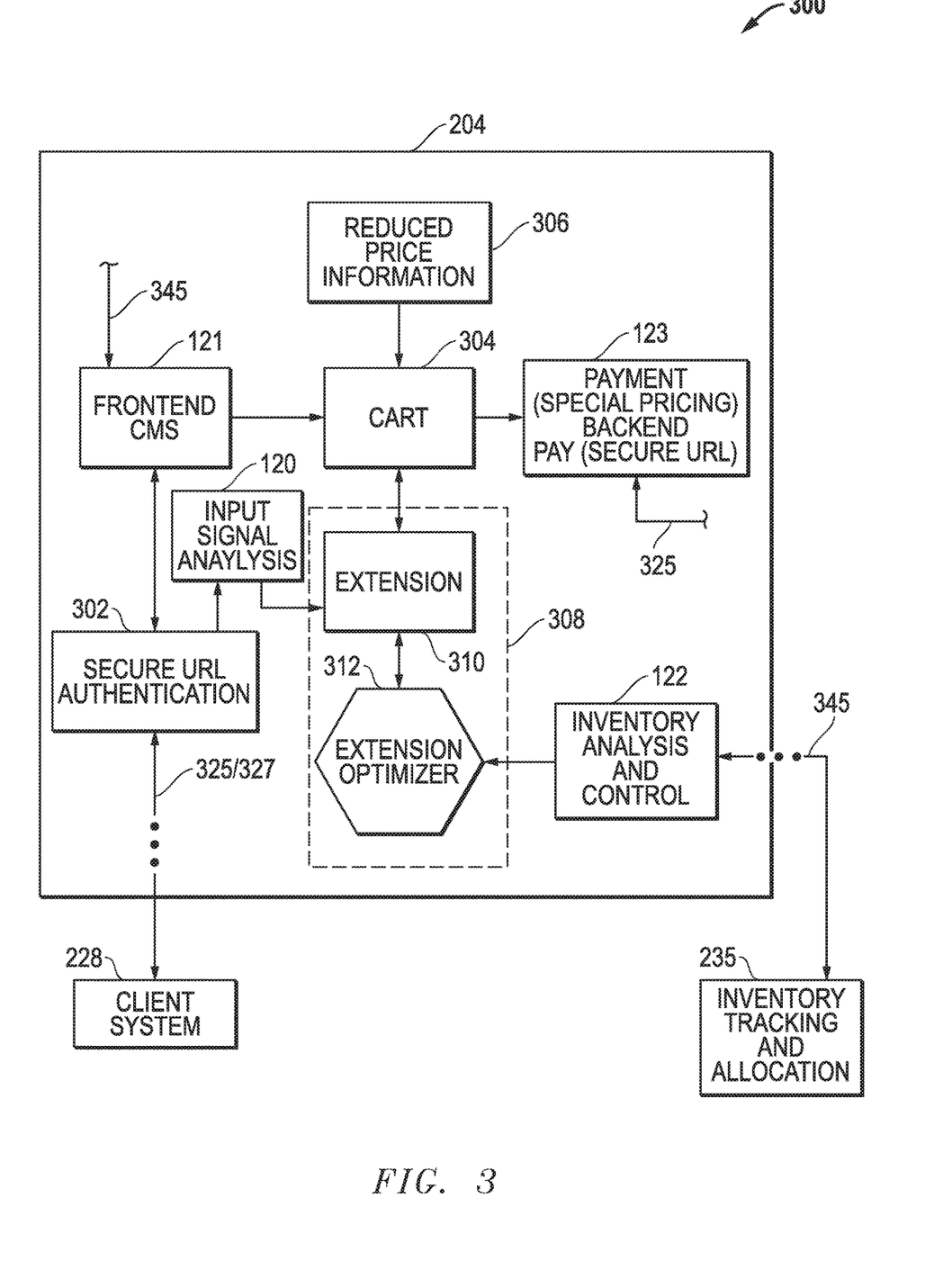
FIG. 3 illustrates a block diagram of a network architecture according to one exemplary embodiment of the disclosed systems and methods.

FIG. 3 illustrates one exemplary embodiment of a network system architecture 300 that may be implemented to control server operations at a server information handling system 204 that is remote from a client system 228 based on indirect characteristics of user input signals provided by a user to a client information handling system 228 and relayed in user input signal information 325 to the server system 204. As shown in FIG. 3, a client system 228 may connect with a frontend content management system (CMS) 121 of host system 204 via secure URL authentication 302. CMS 121 may provide data 327 to generate and cause display of user interface pages containing information (e.g., description, images, pricing, etc.) on particular inventory items 152 that are available for purchase from warehouse inventory 239 on local displays of client systems 228. CMS 121 may be aware of inventory 239 available for purchase by the user via inventory information 345 provided from inventory tracking and allocation system 235 of FIG. 1. CMS may also respond to user input and requests for display of additional or different information related to one or more inventory items 152.

Still referring to FIG. 3, a user may select one or more individual inventory items 152 for potential purchase by placing these items in cart 304 where the identity of the selected items 152 is held until the user commits to purchase the item/s 152, at which time the items are placed into backend payment and shipping 123 and the user enters shipping address and payment information (e.g., credit card information, PayPal payment, etc.). Shipping instructions (e.g., number and identity of purchased items, user shipping address, shipping method, etc.) may then be forwarded to inventory tracking and allocation system 235 or separate shipping information handling system which coordinates the shipping process to the user from warehouse 130. At the same time, inventory tracking and allocation system 235 may update the number of items 152 in available inventory 239 based on the shipment.

In FIG. 3, extension logic 308 that be provided to determine length and other parameters of reduced price time extensions based on analysis of user input signal information 325 and inventory that is provided by input signal analysis logic 120, and based on current available inventory 239 and reserved inventory 237 provided by inventory analysis and control logic 122 as shown. In this regard, extension logic may include an extension optimizer logic 312 that determines extension time and other extension parameters based on the inputs received from both input signal analysis logic 120 and inventory analysis and control logic 122, e.g., in a manner as described further herein. Also included is extension logic 310 that actually implements the extension based on optimized extension information and identity of the selected item 152 that is currently in the cart 304 as described further herein.

Figure 4:
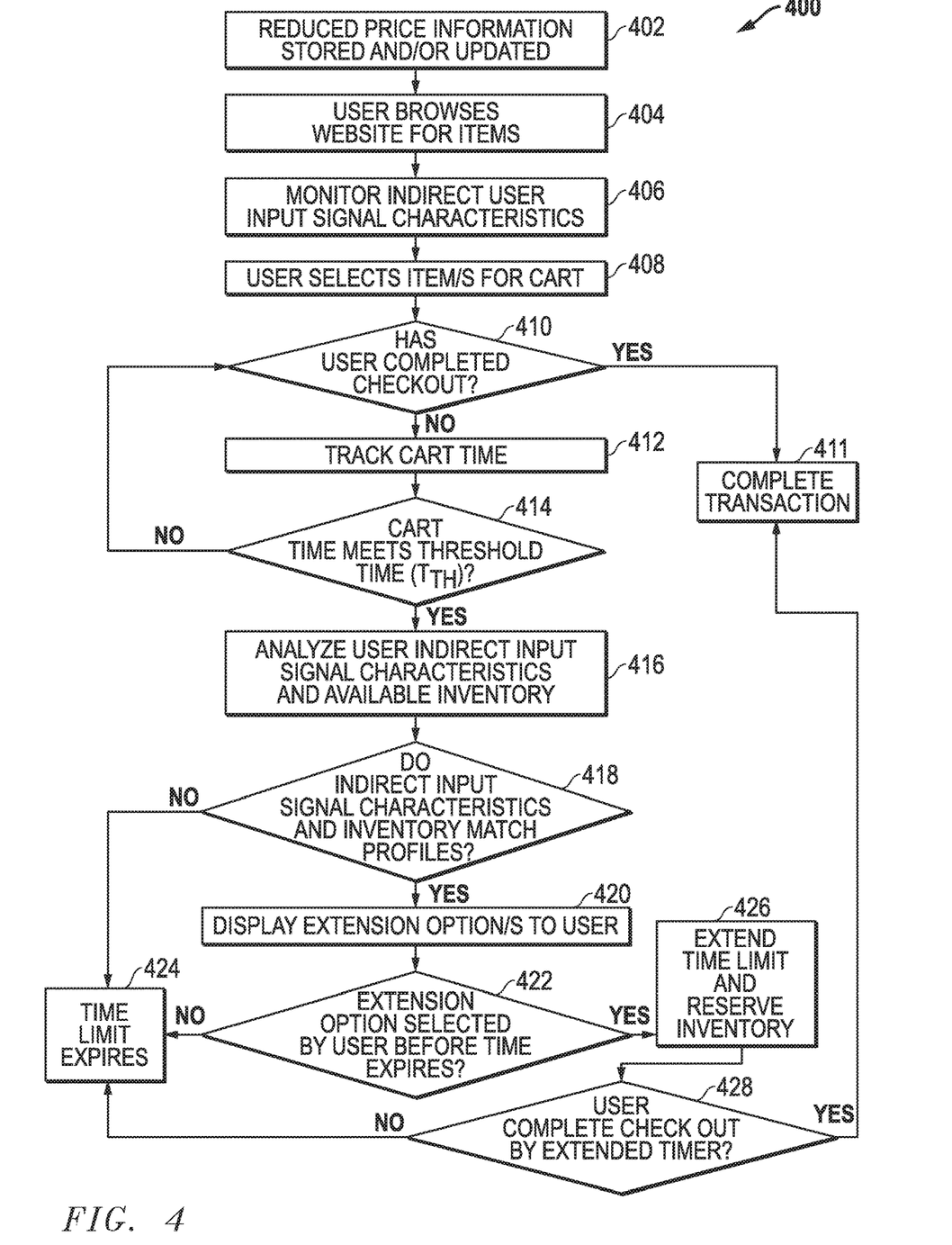
FIG. 4 illustrates methodology according to one exemplary embodiment of the disclosed systems and methods.

FIG. 4 illustrates one exemplary embodiment of methodology 400 that may be implemented (e.g., by input signal analysis logic 120, content management logic 121, payment and shipping logic 123 and inventory analysis an control logic 122 executing on host processing device 206 of server system 204) to control inventory 237/239 and/or operations of server operations at information handling system 204 based on indirect characteristics of user input signals provided by a user to a client information handling system 228, and relayed to server information 204 as user input signal information 325 from a client handling system 228 across network 233. As shown, methodology 400 starts in step 402 where reduced price information 306 (e.g., limited-time promotions, discounts and/or coupons) to be currently offered to users is stored or updated with the goal of increasing user traffic and purchases of inventory items 152 from warehouse 130 by users of client systems 228. Reduced price information may include identity of items 152 covered by a reduced price, amount of price reduction for each item 152, expiration time ($T_{EXP}$) that may be a date and/or set by a date range during which the reduced price opportunity (e.g., discount percentage on original price, dollar amount off the original price, etc.) is valid, etc. FIG. 3 illustrates how reduced price information 306 may be stored and updated (e.g., on storage 218 of system 204) for one or more types of inventory items 152 of warehouse 130.

In step 404 of methodology 400, a user of a client system 228 discovers, accesses, and views website information provided to client system/s 228 in data 327 across network 233 by content management system (CMS) 121 of system 204. While the customer uses an input device 110 to browse various web pages of the website, input signal analysis logic 120 of system 204 monitors indirect characteristics of user input signals in step 406 by analyzing user input signal information 325 that is relayed in data transmitted from a client system 228 to server system 204 and that is the same (or that is indicative of) the user input signals provided from the input device 110 to the client device 228. Examples of such user input signal information 325 includes, but is not limited to, Hypertext Transfer Protocol (HTTP) requests, common gateway interface (CGI) protocol information, etc. Mouse or touchpad pointer movements (e.g., X, Y positions) may be provided as user input signal information 325 in real time to server system 204, for example, via JavaScript executing on client system 228 that reports mouse positions to server system 204. This input signal information may be stored temporarily on server 204 in volatile memory 221 and/or storage 218 where it is associated with the given user (e.g., permanently stored for user that is logged on, temporarily stored for guest user during the duration of the current browsing session), etc.

In one embodiment, step 406 of methodology 400 may be implemented by input signal analysis logic 120 of server system 204 to include a heuristic to determine when a user is interested in a particular item 152 or type (category) of item 152 based on the monitored indirect characteristics of user input signal information 325, and in exchange for this determined interest offer a time extension ($T_{EXT}$) for a limited-time reduced price (e.g., limited-time promotion, discount and/or coupon) for purchase of the item 152. For example, step 406 may include tracking the focus of a current user on a particular item 152 or set of items 152 as a function of time spent by the current user on particular item (product) web page displayed to the user by a browser executing on the client information handling system 228, e.g., by dividing the time spent by the current user viewing an item details page for a given type of item 152 divided by the average time spent by a user from the general population of web users viewing product pages for similar items 152. Such an average time for general web traffic may be pre-determined by server system 204 or other system that performs general website traffic analysis over any suitable selected time period (e.g., the previous 24 hour period, the previous week, the previous month, etc.), and stored in non-volatile storage 218 of server system 204.

From such information, input signal analysis logic 120 may in one embodiment determine a user score (e.g., by generating a numerical value) that represents a ratio of the monitored time that the current user spent viewing the item (e.g., product) details of a current particular item 152 (e.g., an Acme widget) divided by the empirically measured average time spent by a typical user viewing a web page for the same type (or category) of items 152 (e.g., Acme widgets, Brand-X widgets, etc.), e.g., as measured during a given single user session or visit to the webpage (e.g., 30 minute session). Such a determined may be stored in non-volatile memory user score represents the current user's interest in the current item as a percentage of the item's popularity with the universe of web users who view the item item details page. For example, a determined user score of 80% may be determined for a current user that spends 48 seconds viewing the item details web page for an Acme widget compared to a predetermined empirical one minute average time spent by a typical user to view the item details web page for the category of widgets that includes Acme widgets. A determined user score of 20% may be determined for a current user that spends 12 seconds viewing the item details web page for an Acme widget. A user score may similarly be calculated that represents the a ratio of the monitored time that the current user spent viewing the item details of a current particular item 152 (e.g., an Acme widget) divided by the empirically measured average time spent by a typical user viewing a web page for the same item 152 (e.g., the same Acme widget).

In an another exemplary embodiment, the pattern of a current user's mouse or touchpad movements relative to the position of multiple items (e.g., multiple product links) displayed in different areas of a current displayed webpage may be monitored, e.g., to determine the relative amount of cumulative time the pointer is positioned by the current user over (e.g., hovering over) the different displayed items on the same webpage without clicking on the item during a given single user session or visit to the webpage (e.g., 30 minute session or any other determined user session time period), and/or to determine the number of separate times the mouse or touchpad pointer is moved to be positioned over a given item (e.g., product link) by a current user during a given single user session or visit to the webpage (e.g., 30 minute session or other determined session time). In this regard, a movement of the pointer to be positioned over a given item may also include any pointer movement away from being over the given displayed item followed by return of the pointer to a position over the given displayed item during the same user session. In this embodiment, a corresponding user score may be developed, e.g., by determining a ratio by dividing the cumulative time (and/or number of times) the current user's mouse or touchpad pointer is move to be positioned over the given item 152 (e.g., product link) or set of items 152 divided by the average time (and/or number of times) a typical user's mouse or touchpad pointer is moved to be positioned over the same item 152 or same category of items 152.

In step 408, a user selects one or more individual items 152 and adds these selected items to a list in the user's shopping cart 304 where system 204 matches reduced price information 306 (e.g., limited-time promotions, discounts and/or coupons) to the user-selected items 152. In step 410, the user may complete check out with the reduced price, in which case the transaction is completed in step 411 using secure checkout payment and shipping operation 123. However, in step 408 a user may be aware of the specific expiration ($T_{EXP}$) of a given reduced price offer, but nonetheless may not complete a purchase of the selected item/s (e.g., complete check out) in steps 410 and 411, in which case the item 152 remains unpurchased in the user's cart 304, which may be saved after completion of a user's browsing session in storage 218 or memory 221 of server system 204. If check out has not been completed in step 410, then the time that the item 152 remains unpurchased in cart 304 may be tracked in step 412 by input signal analysis 120 until a predefined threshold time value ($T_{TH}$) is met in step 414. Predefined $T_{TH}$ may be selected as needed or desired to fit the characteristics of a given application. For example, in one embodiment $T_{TH}$ may be an elapsed cumulative time (e.g., one day, two days, etc.) that the unpurchased item 152 has resided in the cart 304 prior to expiration time ($T_{EXP}$) of the reduced price offer, assuming that the reduce price offer has not already expired prior to $T_{TH}$ elapsed time. In another embodiment, $T_{TH}$ may be a designated time period (e.g., one day, two days, etc.) prior to the expiration time ($T_{EXP}$) of the reduced price offer.

Once the predefined threshold time value ($T_{TH}$) is met in step 414 with selected item 152 remaining unpurchased in cart 304, then methodology 400 proceeds to step 416. In another embodiment, steps 412 through 414 may be omitted, in which case methodology 400 may proceed directly from step 410 to step 416, e.g., where immediate purchase in step 411 by the user does not occur. In step 416, the monitored indirect input signal characteristics (e.g., determined user score) from step 406 are analyzed by input signal analysis logic 120, optionally together with the number of real time available inventory 239 and/or reserved inventory 237 (e.g., already earmarked for reduced price promotion) of the selected item 152 that is provided to input signal analysis logic 120 by inventory tracking and allocation system 235, e.g., via inventory analysis and control logic 122 of server system 204. For example, it may be determined in step 416 whether or not any available inventory 239 remains for the selected item 152 (e.g., such as during a holiday season). At the same time, the monitored indirect input signal characteristics may be analyzed to determine a particular reduced-price time extension option to be offered to the user for the selected item. Such a reduced-price time extension option may include a defined extension time length ($T_{EXT}$) in combination with other parameters such as extension cost, and any "shelf life" countdown time limit ($T_{ACCEPT}$) or other condition/s to be placed on the extension option. One or more of such options may be stored, for example as a look-up table in non-volatile storage 218 of server system 204.

Table 1 below illustrates examples of multiple different options that may be stored in a look-up table on server system 204 and accessed during execution of methodology 400. In this example, an additional condition in the form of a limited "shelf life" time $T_{ACCEPT}$ of 5 minutes is specified for the user to accept the offered extension option in the case of users having lower user scores. It will be understood that the parameters of the options of Table 1 are exemplary only, and that different, additional, fewer and/or alternative options (as well as different extension lengths, costs, and/or acceptance time limits) may be defined and stored as desired or needed to fit a given situation or application. Moreover, it will be understood that extension time $T_{EXT}$ may be defined in any suitable unit of time, e.g., minutes, hours, days, specified deadline date, etc.). As shown, in the embodiment of FIG. 2 remote access controller 225 optionally may provide access to a remote administrator system 229 to allow remote administrator users to manage, administer, use, and/or access various resources of host system 204 (e.g., either native or virtual) from a remote location, e.g., via network 233 and/or other suitable communication media. In this regard, parameters of option parameter data (e.g., such as lookup Table 1) may be configuration options that may be edited and changed on server system 206, e.g., via input from user interface 110z to an admin page for server system 204.

TABLE 1

Example Reduced - Price Extension Options for Acme Widget

| Determined User Score | Length of Extension Time ($T_{EXT}$) for Reduced Price | Time Extension Cost to User ($ or other currency value based on percentage value) | Time Limit ($T_{ACCEPT}$) for User to Accept Time Extension Option |
|---|---|---|---|
| Greater than 75% | 30 Days | 5% of the Coupon Cost | Unlimited |
| From greater than 50% up to 75% | 15 Days | 10% of the Coupon Cost | Unlimited |
| From greater than | 10 Days | 15% of the Coupon | Within 5 minutes |

TABLE 1-continued

Example Reduced - Price Extension Options for Acme Widget

| Determined User Score | Length of Extension Time ($T_{EXT}$) for Reduced - Price | Time Extension Cost to User ($ or other currency value based on percentage value) | Time Limit ($T_{ACCEPT}$) for User to Accept Time Extension Option |
|---|---|---|---|
| 25% up to 50% | | Cost | of Offer of Time Extension Offer |
| Less than or equal to 25% | None | N/A | N/A |

Next in step 418, it is determined from analyzed indirect input signal characteristics (e.g., user score) of step and inventory of step 416 whether or not to offer the current user an extension of the limited time reduced-price offer for the current selected item 152. For example, using the look up table information of Table 1, if no available inventory 239 of the current selected item 152 currently exists and/or the determined user score is less than or equal to 25%, then methodology 400 proceeds to step 424 where the reduced-price offer is allowed to expire at the original expiration time ($T_{EXT}$) as scheduled without any added extension time ($T_{EXP}$). However, assuming that available inventory 239 of the current selected item 152 currently exists and that the determined user score is greater than 25%, then methodology 400 proceeds to step 420 where an option to extend the original expiration time ($T_{EXP}$) of the limited time reduced-priced offer for the current selected item 152 is selected from Table 1 (e.g., having a time extension length ($T_{EXT}$) and cost corresponding to the determined user score from step 406) and displayed to the user, e.g., as a pop-up page or window displayed on a display device of a client information handling system 228 that disappears after expiration of the original predetermined expiration time ($T_{EXP}$).

In the exemplary embodiment of Table 1, the time extension cost to a user may be calculated based on the coupon cost for the coupon being extended (i.e., the currency value of the discount being offered to the user based on the coupon). For example, assuming an item 152 having a regular list price of $1000 and an offered coupon discount value of 20% off the list price, then the corresponding coupon cost is $1000×20%=$200 (U.S. dollars used only as an example currency). In this example, based on options of Table 1 the time extension cost for a first user having a determined user score greater than 75% (e.g., user score=85%) would be equal to 5% of the $200 coupon cost which is $10. Thus, based on the stored options of Table 1, a $10 time extension cost would be required from the first user with greater than 75% user score to purchase a 30 day time extension for using the 20% off coupon to purchase the $1000 item 152. Based on stored options of Table 1, the first user would be given an unlimited amount of time to accept the time extension offer and pay the $10 time extension cost. For a second user with a determined user score from greater than 25% up to 50% (e.g., user score=42%), the time extension cost would be equal to 15% of the $200 coupon cost which is equal to a $30 time extension cost for the second user to purchase a 10 day time extension. Based on stored options of Table 1, the second user would be given 5 minutes to accept the time extension offer and pay the $30 time extension cost, after which the time extension offer will expire and no longer be offered to the second user. It will be understood that the price and percentage values of this example are illustrative only.

Next, in step 422, it is determine whether the user has selected the offered time extension option prior to the original expiration time ($T_{EXP}$) of the limited-time reduced price offer, or alternatively prior to expiration of a determined $T_{ACCEPT}$ time limit based on Table 1. If not, then methodology 400 terminates in step 424 where the time limit expires at $T_{EXP}$, or alternatively after expiration of the corresponding determined $T_{ACCEPT}$ time limit. However, if the user has timely selected the offered time extension length (e.g., with payment of required extension cost) the methodology proceeds to step 426 where the time limit for purchasing the selected item 152 at the original reduced price (or discount percentage) is extended for the current user by the offered time extension length to a new time limit ($T_{NEW}$)=$T_{EXP}$+$T_{EXT}$. This extension of time may be performed using any suitable user-specific methodology, e.g., such as sending a secure link to the user of a client system 228 to be used by the current user to buy the product at the predetermined price at a future date before the expiration time of $T_{NEW}$. After expiration of the original reduced price extension time ($T_{EXP}$) the reduced-price offer (e.g., coupon/discount/promotion) is no longer available for other users who have not extended the expiration time.

Still referring to step 426, inventory analysis and control logic 122 may optionally notify inventory tracking and allocation system 235 to change the status of an item 152 currently in available inventory 239 to be in reserved inventory 237 for future purchase until the current user completes purchase of the item 152 or the expiration of the new time limit ($T_{NEW}$). In another embodiment, inventory analysis and control logic 122 may perform predictive analysis to determine whether (and how much) inventory to reserve based on the current number of items 152 in reserved inventory 237 and available inventory 239 that are reported from inventory tracking allocation system 235. For example, a predefined percentage (e.g., 5%) of total inventory (inventory 237+inventory 239) may be designated to be maintained as reserved inventory for purchase of items 152 currently undergoing checkout. Inventory analysis and control logic 122 may determine whether to move an additional item from available inventory 239 to reserved inventory 237 based on the length of extended reduced-price time until new time limit ($T_{NEW}$) selected by the current user. Then it is determined in step 428 whether the current user has completed the checkout transaction using payment and shipping logic 123 by the extended time limit ($T_{NEW}$). If not, then the methodology 400 terminates in step 414. However, if the current user has completed checkout in step 428 to purchase the selected item 152 in cart 304, then methodology proceeds to step 411 where the transaction is completed. Inventory analysis and control logic 122 may also optionally notify inventory procurement information handling system 241 to acquire (e.g., purchase or transfer) additional inventory items 152, e.g., to replace those items 152 purchased by users and/or based on the length of extended reduced-price time until new time limit ($T_{NEW}$) for items 152 selected by current users.

It will be understood that particular illustrated steps of methodology 400 are exemplary only, and that any other combination of additional, fewer and/or alternative steps may be employed that is suitable for controlling server operation using indirect user input signal characteristics.

It will also be understood that one or more of the tasks, functions, or methodologies described herein (e.g., including those described herein for components 206, 209, 225, 163, 235, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program including instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method of operating at least one server information handling system, comprising executing logic on at least one programmable integrated circuit to:
   first display a webpage to users of a general web traffic population;
   then empirically measure general web traffic user population viewing characteristics by empirically measuring at least one of:
      an average amount of time spent by the users of the general web traffic user population viewing the displayed webpage,
      an average amount of time that a mouse or touchpad pointer is positioned over the same given link on the displayed webpage without clicking by the users of the general web traffic user population viewing the displayed webpage, or
      an average cumulative number of times that a mouse or touchpad pointer is moved in a position over the same given link on the webpage without clicking by the users of the general web traffic user population viewing the displayed webpage;
   then display the same webpage to a current user of a client information handling system;
   then receive current user input signal information across a network from the current user of the client information handling system;
   then monitor indirect user input signal characteristics from the current user input signal information by tracking at least one of the duration of time spent by the current user on the displayed webpage, the cumulative amount of time that a mouse or touchpad pointer is positioned by the current user over a given link on the displayed webpage without clicking, or a cumulative number of times that a mouse or touchpad pointer is moved by the current user in a position over a given link on the webpage without clicking; and
   then compare the monitored indirect user input signal characteristics to the empirically-measured general web traffic user population viewing characteristics by at least one of:
      comparing the tracked duration of time spent by the current user on the displayed webpage to the empirically-measured average amount of time spent by the users of the general web traffic user population viewing the displayed webpage,
      comparing the tracked cumulative amount of time that the mouse or touchpad pointer is positioned by the current user over the given link on the displayed webpage without clicking to the empirically-measured average amount of time that a mouse or touchpad pointer is positioned over the same given link on the displayed webpage without clicking by the users of the general web traffic user population viewing the displayed webpage, or
      comparing the tracked cumulative number of times that the mouse or touchpad pointer is moved by the current user in a position over a given link on the webpage without clicking to the empirically-measured average cumulative number of times that a mouse or touchpad pointer is moved in a position over the same given link on the webpage without clicking by the users of the general web traffic user population viewing the displayed webpage;

where the method further comprises executing logic on at least one programmable integrated circuit to:
  track real time presence and/or movement of individual physical items of an inventory of physical items currently maintained within a storage facility using received radio frequency identification (RFID) signals received from RFID tags attached to the individual physical items of the physical items currently maintained within the storage facility or using input from scanned item barcodes attached to the individual physical items of the physical items currently maintained within the storage facility, and
  alter an amount of the individual physical items of the physical items item inventory that are maintained within the storage facility by causing either removal of one or more of the individual physical items from the storage facility or transfer of one or more of the individual items to the storage facility based on the tracked real time presence of individual physical items of the physical items currently maintained within the storage facility and the comparison of the monitored indirect user input signal characteristics to the empirically-measured general web traffic user population viewing characteristics.

2. The method of claim 1, where the user input signal information comprises at least one of Hypertext Transfer Protocol (HTTP) requests, common gateway interface (CGI) protocol information, or mouse or touchpad pointer position on a displayed webpage.

3. The method of claim 1, where the server information handling system comprises a first programmable integrated circuit, and is coupled to at least one additional information handling system that comprises a second programmable integrated circuit that is programmed to track a number and identity of individual physical items within the item inventory of physical items maintained within the storage facility using the received RFID signals or input scanned item barcodes; and where the method further comprises receiving a current number and identity of individual physical items currently present within the item inventory from the second programmable integrated circuit of the additional information handling system, and executing logic on the first programmable integrated circuit to control operation of the server information handling system based on the monitored indirect user input signal characteristics and the current number and identity of individual physical items within the item inventory.

4. The method of claim 3, further comprising:
  maintaining a first group of reserved physical items in a first section of the storage facility that is physically separate from a second and different group of available physical items that are maintained in a separate section of the storage facility;
  executing logic on the first programmable integrated circuit of the server information handling system to transmit instructions to the second programmable integrated circuit of the additional information handling system to assign either an available or a reserved status to individual physical items of the physical items within the item inventory and to cause physical movement of individual physical items between the first section of the storage facility and the second section of the storage facility based at least in part on the monitored indirect user input signal characteristics and the number of physical items currently within the item inventory.

5. The method of claim 3, where the server information handling system is coupled to at least one additional information handling system comprising a third programmable integrated circuit that is programmed to procure additional physical items for the item inventory; and where the method further comprises executing logic on the first programmable integrated circuit to transmit instructions to the third programmable integrated circuit of the additional information handling system to procure additional physical items for the item inventory by causing transfer of additional individual physical items of the physical items to the item inventory maintained within the storage facility based at least in part on the monitored indirect user input signal characteristics and the number of physical items currently within the item inventory.

6. The method of claim 1, further comprising executing logic on a first programmable integrated circuit of the server information handling system to transmit data to a second programmable integrated circuit of the client information handling system to display a webpage that describes item details to a current user of the client information handling system that comprises descriptive information for a given physical item that is available for purchase by the current user using the webpage; and executing logic on the first programmable integrated circuit of the server information handling system to transmit data to the second programmable integrated circuit of the client information handling system to alter at least one of a duration time or an expiration date of a limited-time reduced price offer displayed to the current user for purchasing the given physical item.

7. The method of claim 6, further comprising executing logic on the first programmable integrated circuit of the server information handling system to transmit data to the second programmable integrated circuit of the client information handling system to at least one of increase the duration time of a limited-time reduced price offer displayed to the current user for purchasing the given physical item, or to extend to a later date the expiration date of a limited-time reduced price offer displayed to the current user for purchasing the given physical item.

8. The method of claim 1, further comprising executing logic on a first programmable integrated circuit of the server information handling system.

9. The method of claim 8, further comprising executing logic on the first programmable integrated circuit of the server information handling system to determine and store in non-volatile storage of the server information handling system a user score for the current user determined using empirically-determined average data for an average user from the general web traffic user population during a given single user session or visit to the webpage that is retrieved from memory of the server information handling system.

10. The method of claim 9, where the determined user score comprises at least one of: a ratio of the amount of time the webpage is displayed to the current user by a browser executing on the second programmable integrated circuit of the client information handling system during a given single user session or visit to the webpage divided by the empirically-determined average amount of time spent by the users of the general web traffic user population viewing the displayed webpage, the cumulative amount of time that a mouse or touchpad pointer is positioned by the current user over a given link on the webpage without clicking during a given single user session or visit to the webpage divided by the empirically-determined average amount of time that a mouse or touchpad pointer is positioned over the same given link on the webpage without clicking by the users of the general web traffic user population, or the cumulative number of times that a mouse or touchpad pointer is moved by the current user in a position over a given link on the webpage without clicking during a given single user session or visit to the webpage divided by the empirically-determined average cumulative number of times that a mouse or touchpad pointer is moved in a position over the same given link on the webpage without clicking by the users of the general web traffic user population.

11. The method of claim 10, further comprising executing logic on the first programmable integrated circuit of the server information handling system to transmit data to the second programmable integrated circuit of the client information handling system to: provide an extension option to the current user to pay to extend at least one of a duration time or an expiration date of a limited-time reduced price offer displayed to the current user for purchasing the given physical item at a reduced price based on availability of the given physical item in inventory and a magnitude of the determined user score for the current user; and reserving the given physical item in the inventory for future purchase by the current user if the current user responds to the displayed option by providing user input to the second programmable integrated circuit of the client information handling system to accept and pay for the displayed extension option.

12. The method of claim 11, further comprising executing logic on the first programmable integrated circuit of the server information handling system to transmit data to the second programmable integrated circuit of the client information handling system when the current user has a first determined user score to increase the duration of the limited-time reduced price offer to a first time duration during which a current user is allowed to purchase the given physical item at a first reduced price; and to transmit data to the first programmable integrated circuit of the client information handling system when the current user has a second determined user score to set the duration of the limited-time reduced price offer to a second time duration during which the current user is allowed to purchase the given physical item at a second reduced price; where the first time duration is longer than the second time duration; and where the first reduced price is lower than the second reduced price.

13. A server information handling system comprising non-volatile memory coupled to a first processing device communicating across a network with a second processing device of a client information handling system and a third processing device of first additional information handling system that is located with a storage facility that contains physical items, the first processing device of the server information handling system being programmed to:
first store empirically-measured general web traffic user population viewing characteristics on the non-volatile memory, the general web traffic user population viewing characteristics comprising at least one of:
an average amount of time spent by users of the general web traffic user population viewing a displayed webpage,
an average amount of time that a mouse or touchpad pointer is positioned over the same given link on the displayed webpage without clicking by the users of the general web traffic user population viewing the displayed webpage, or
an average cumulative number of times that a mouse or touchpad pointer is moved in a position over the same given link on the webpage without clicking by the users of the general web traffic user population viewing the displayed webpage;
then transmit data to the second processing device of the client information handling system to display the same webpage to a current user of the client information handling system;
then receive current user input signal information across the network from the second processing device of the client information handling system;
then monitor indirect user input signal characteristics from the current user input signal information by tracking at least one of the duration of time spent by the current user on the displayed webpage, the cumulative amount of time that a mouse or touchpad pointer is positioned by the current user over a given link on the webpage without clicking, or a cumulative number of times that a mouse or touchpad pointer is moved by the current user in a position over a given link on the webpage without clicking;
then compare the monitored indirect user input signal characteristics to the empirically-measured general web traffic user population viewing characteristics by at least one of:
comparing the tracked duration of time spent by the current user on the displayed webpage to the empirically-measured average amount of time spent by the users of the general web traffic user population viewing the displayed webpage,
comparing the tracked cumulative amount of time that the mouse or touchpad pointer is positioned by the current user over the given link on the displayed webpage without clicking to the empirically-measured average amount of time that a mouse or touchpad pointer is positioned over the same given link on the displayed webpage without clicking by the users of the general web traffic user population viewing the displayed webpage, or
comparing the tracked cumulative number of times that the mouse or touchpad pointer is moved by the current user in a position over a given link on the webpage without clicking to the empirically-measured average cumulative number of times that a mouse or touchpad pointer is moved in a position over the same given link on the webpage without clicking by the users of the general web traffic user population viewing the displayed webpage;
where the third processing device of the first additional information handling system is programmed to track real time presence and/or movement of individual physical items currently contained within the storage facility using received radio frequency identification (RFID) signals received from RFID tags attached to the individual physical items of the physical items currently contained within the storage facility or using input from scanned item barcodes attached to the individual physical items of the physical items currently contained within the storage facility; and
where the first processing device of the server information handling system is further programmed to alter an amount of the individual physical items are contained within the storage facility by causing either removal of one or more of the individual physical items from the storage facility or transfer of one or more of the individual items to the storage facility based on the tracked real time presence of individual physical items of the physical items currently maintained within the storage facility and the comparison of the monitored indirect user input signal characteristics to the empirically-measured general web traffic user population viewing characteristics.

14. The system of claim 13, where the where the third processing device of the first additional information handling system is programmed to track the current number and identity of individual physical items currently contained within the storage facility; and where the first processing device of the server information handling system is programmed to receive the current number and identity of individual physical items currently contained within the storage facility from the third processing device of the first additional information handling system, and to control operation of the server information handling system based on the monitored indirect user input signal characteristics and the current number and identity of individual physical items contained within the storage facility.

15. The system of claim 13, where a first group of reserved physical items are maintained in a first section of the storage facility that is physically separate from a second group of available physical items that are maintained in a separate section of the storage facility; and where the first processing device of the server information handling system is programmed to at least one of:
  instruct a fourth processing device of a second additional information handling system to assign either an available or a reserved status to individual physical items contained within the storage facility and to cause physical movement of individual physical items between the first section of the storage facility and the second section of the storage facility based at least in part on the monitored indirect user input signal characteristics and the number of physical items currently contained within the storage facility; or
  provide instructions to the fourth processing device of the second additional information handling system to cause transfer of additional physical items into the storage facility based at least in part on the monitored indirect user input signal characteristics and the number of physical items currently contained within the storage facility.

16. The system of claim 13, where the first processing device of the server information handling system is programmed to cause the second processing device of the client information handling system to display a webpage that describes item details to a current user of the client information handling system, the displayed webpage including descriptive information for a given physical item that is available for purchase by the current user using the webpage; and to control operation of the server information handling system to transmit data to the second processing device of the client information handling system to alter at least one of a duration time or an expiration date of a limited-time reduced price offer displayed to the current user for purchasing the given physical item.

17. The system of claim 16, where the first processing device of the server information handling system is programmed to control operation of the server information handling system to transmit data to the second processing device of the client information handling system to at least one of increase the duration time of a limited-time reduced price offer displayed to the current user for purchasing the given physical item, or to extend to a later date the expiration date of a limited-time reduced price offer displayed to the current user for purchasing the given physical item.

18. The system of claim 13, where the storage facility is a warehouse.

19. The system of claim 13, where the physical items are electronic devices, tools, cosmetics, groceries, petroleum liquids or gases.

20. The system of claim 13, where the first processing device of the server information handling system is programmed to empirically measure the general web traffic user population viewing characteristics over a selected time period prior to then displaying the same webpage to the current user of a client information handling system, the selected time period comprising at least one of a previous 24 period, a previous week or a previous month.

21. The system of claim 13, where the first processing device of the server information handling system is programmed to track the cumulative amount of time that a mouse or touchpad pointer is positioned by the current user over a given link on the webpage without clicking; and compare the tracked cumulative amount of time that the mouse or touchpad pointer is positioned by the current user over the given link on the displayed webpage without clicking to the empirically-measured average amount of time that a mouse or touchpad pointer is positioned over the same given link on the displayed webpage without clicking by the users of the general web traffic user population viewing the displayed webpage.

22. A system, comprising:
  a server information handling system comprising a first processing device coupled by a network to a second processing device of a client information handling system, the second processing device of the client information handling system being programmed to receive user input signals from a current user via at least one user input device coupled to the client information handling system, and to provide user input signal information based on the user input signals across the network to the first processing device of the server information handling system;
  a storage facility containing physical items,
  a first additional information handling system located at the storage facility and comprising a third processing device coupled to an antenna and a radio frequency (RF) receiver to receive radio frequency identification (RFID) signals transmitted from RFID tags attached to each of the individual physical items to indicate real time presence and/or location of each of the physical items contained within the storage facility, the third processing device being coupled by the network to the first processing device of the server information handling system and being programmed to track real time presence and/or movement of individual physical items of the physical items contained within the storage facility using received radio frequency identification (RFID) signals received by the antenna and RF receiver from RFID tags attached to the individual items of the physical items currently contained within the storage facility or using input from scanned item barcodes attached to the individual physical items of the physical items currently contained within the storage facility; and
  a second additional information handling system comprising a fourth processing device coupled by the network to the first processing device of the server information handling system, the fourth processing device being programmed to transmit a tracked current number and identity of individual physical items currently contained within the storage facility across the network to the first processing device of the server information handling system;

where the first processing device of the server information handling system is programmed to first display a webpage to users of a general web traffic population, and then empirically measure general web traffic user population viewing characteristics by empirically measuring at least one of:
  an average amount of time spent by the users of the general web traffic user population viewing the displayed webpage,
  an average amount of time that a mouse or touchpad pointer is positioned over the same given link on the displayed webpage without clicking by the users of the general web traffic user population viewing the displayed webpage, or
  an average cumulative number of times that a mouse or touchpad pointer is moved in a position over the same given link on the webpage without clicking by the users of the general web traffic user population viewing the displayed webpage; and
where the first processing device of the server information handling system is further programmed to:
  then display the same webpage to a current user of a client information handling system,
  then monitor indirect user input signal characteristics from the current user input signal information by tracking at least one of the duration of time spent by the current user on the displayed webpage, the cumulative amount of time that a mouse or touchpad pointer is positioned by the current user over a given link on the displayed webpage without clicking, or a cumulative number of times that a mouse or touchpad pointer is moved by the current user in a position over a given link on the webpage without clicking, and
  then compare the monitored indirect user input signal characteristics to the empirically-measured general web traffic user population viewing characteristics;
  then respond to the tracked current number and identity of the individual physical items currently contained within the storage facility and the comparison of the monitored indirect user input signal characteristics to the empirically-measured general web traffic user population viewing characteristics by notifying the fourth processing device of the second additional information handling system to alter an amount of the individual physical items of the physical items are contained within the storage facility based on the comparison of the monitored indirect user input signal characteristics to the empirically-measured general web traffic user population viewing characteristics and the current number and identity of individual physical items contained within the storage facility; and
where the fourth processing device of the second additional information handling system is programmed to respond to the notification received from the first processing device by causing either removal of one or more of the individual physical items from the storage facility or transfer of one or more of the individual items to the storage facility based on the comparison of the monitored indirect user input signal characteristics to the empirically-measured general web traffic user population viewing characteristics and the tracked real time presence of individual physical items of the physical items currently contained within the storage facility.

23. The system of claim 22, where the storage facility comprises physically separate first and second sections, the first section maintaining a first group of reserved physical items and the second section maintaining a second and different group of available physical items; and where the first processing device of the server information handling system is programmed to:
  assign either an available or a reserved status to individual physical items contained within the storage facility and cause physical movement of individual physical items between the first section of the storage facility and the second section of the storage facility based at least in part on the monitored indirect user input signal characteristics and the number of physical items currently contained within the storage facility; or
  notify the fourth processing device of the second additional information handling system to transfer additional physical items to the storage facility from other storage facilities based at least in part on the monitored indirect user input signal characteristics and the number of items currently contained within the storage facility.

24. The system of claim 22, where the storage facility is a warehouse.

25. The system of claim 22, where the physical items are electronic devices, tools, cosmetics, groceries, petroleum liquids or gases.

26. The system of claim 22, where the first processing device of the server information handling system is programmed to empirically measure the general web traffic user population viewing characteristics over a selected time period prior to then displaying the same webpage to the current user of a client information handling system, the selected time period comprising at least one of a previous 24 period, a previous week or a previous month.

27. The method of claim 1, where the storage facility is a warehouse.

28. The method of claim 1, where the physical items are electronic devices, tools, cosmetics, groceries, petroleum liquids or gases.

29. The method of claim 1, further comprising executing the logic on the at least one programmable integrated circuit to empirically measure the general web traffic user population viewing characteristics over a selected time period prior to then displaying the same webpage to the current user of a client information handling system, the selected time period comprising at least one of a previous 24 period, a previous week or a previous month.

30. The method of claim 1, further comprising tracking the cumulative amount of time that a mouse or touchpad pointer is positioned by the current user over a given link on the webpage without clicking; and comparing the tracked cumulative amount of time that the mouse or touchpad pointer is positioned by the current user over the given link on the displayed webpage without clicking to the empirically-measured average amount of time that a mouse or touchpad pointer is positioned over the same given link on the displayed webpage without clicking by the users of the general web traffic user population viewing the displayed webpage.

* * * * *